United States Patent [19]
Pickles

[11] 3,712,573
[45] Jan. 23, 1973

[54] SIX-WAY VEHICLE SEAT ADJUSTER

[75] Inventor: Joseph Pickles, Birmingham, Mich.

[73] Assignee: Ferro Manufacturing Corporation, Detroit, Mich.

[22] Filed: Nov. 19, 1970

[21] Appl. No.: 90,945

[52] U.S. Cl. ............................................... 248/394
[51] Int. Cl. ............................................. F16m 11/12
[58] Field of Search ....................... 248/394; 74/801

[56]  References Cited

UNITED STATES PATENTS

| 3,335,995 | 8/1967 | Pickles | 248/394 |
|---|---|---|---|
| 3,240,464 | 3/1966 | Pickles | 248/394 X |
| 3,330,523 | 7/1967 | Nichols | 248/394 X |
| 3,188,044 | 6/1965 | Epple | 248/394 X |
| 2,921,621 | 1/1960 | Williams et al. | 248/394 |
| 1,396,426 | 11/1921 | Hartford | 74/801 |

*Primary Examiner*—William H. Schultz
*Attorney*—Whittemore, Hulbert & Belknap

[57] ABSTRACT

A six-way vehicle seat adjuster having a motor driven worm driving two worm gears one of which is connected through two clutches to vertical adjusting mechanism at each end of the vehicle seat, and the other of which is connected through a clutch to mechanism for adjusting the seat fore and aft.

5 Claims, 13 Drawing Figures

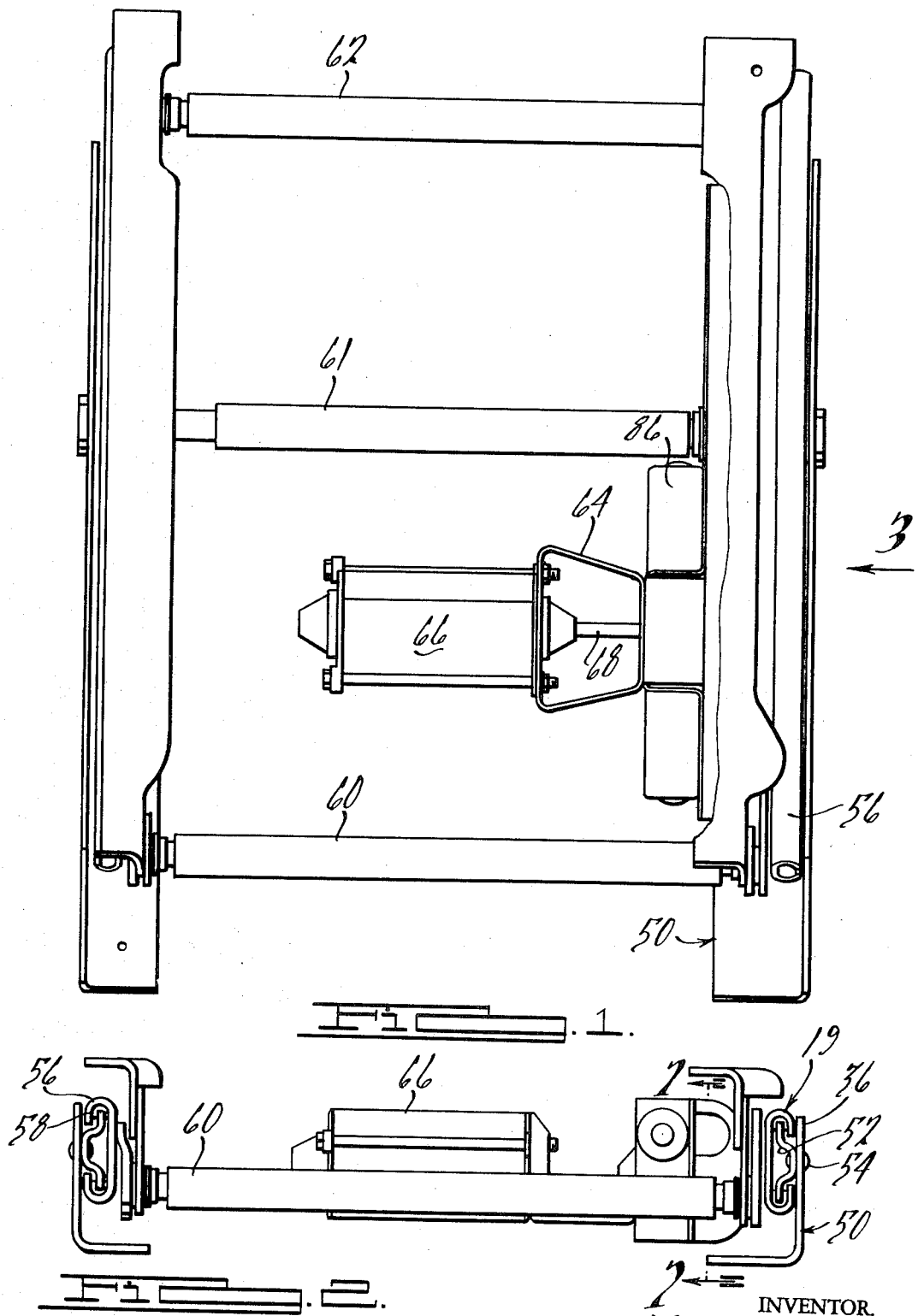

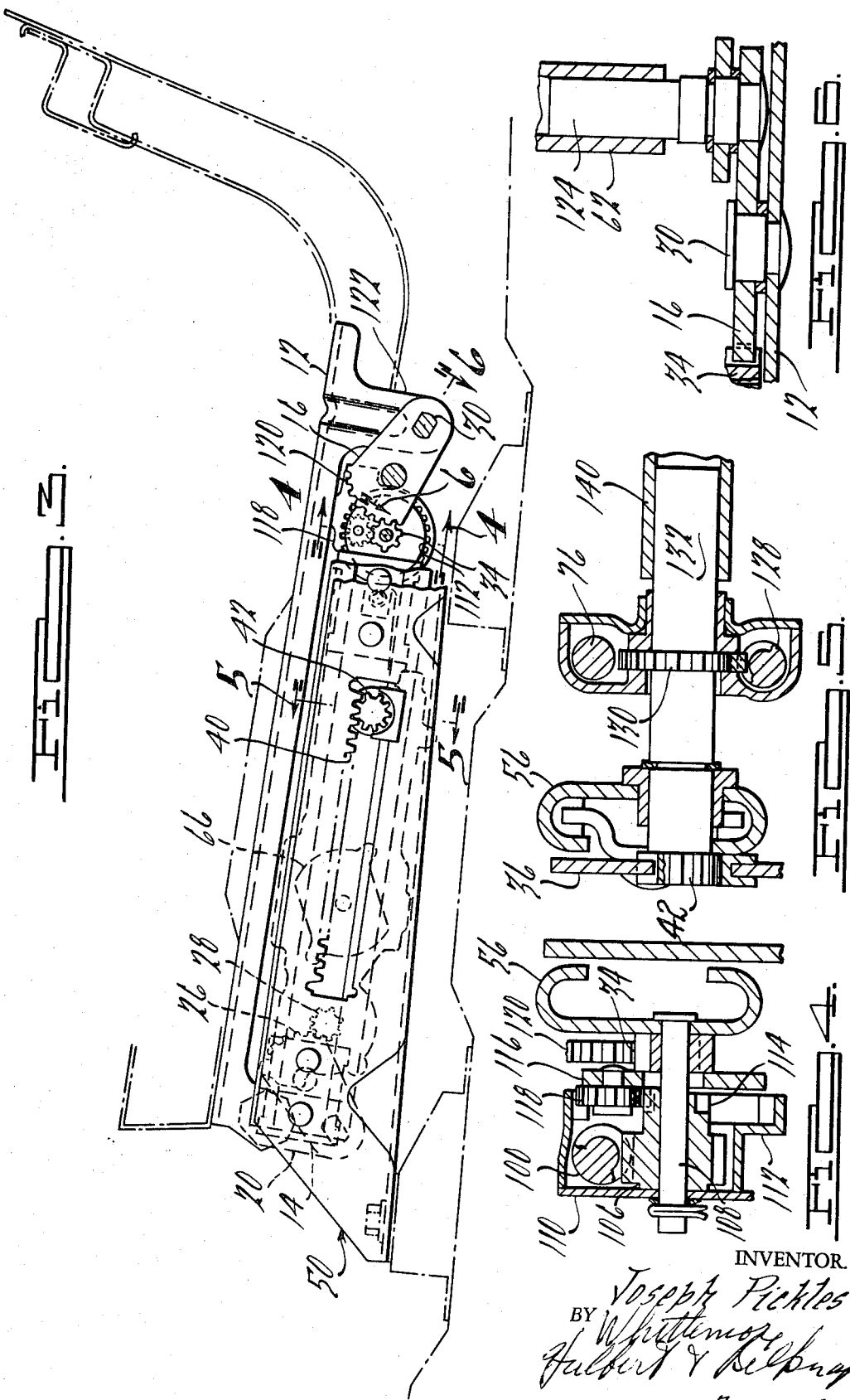

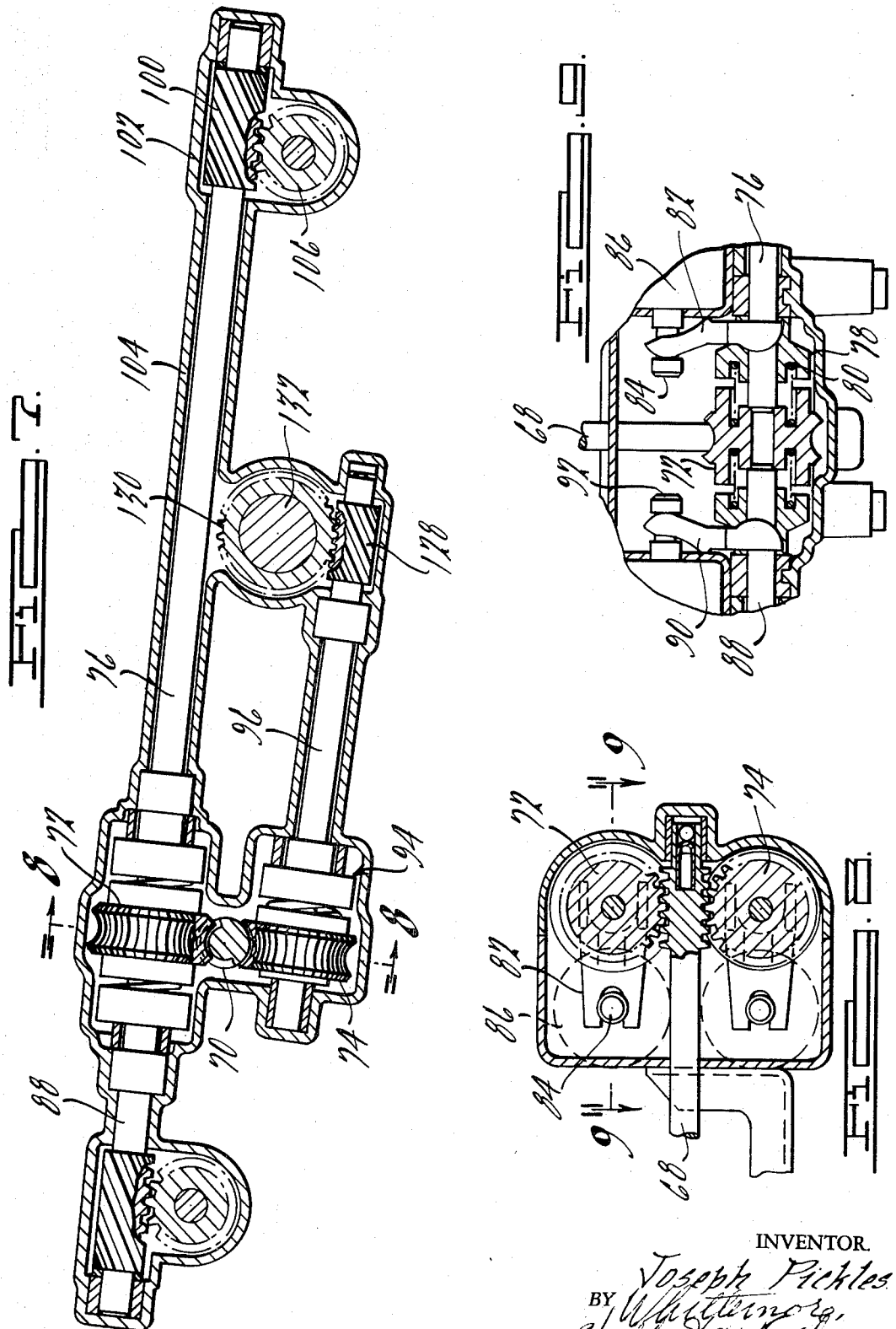

SIX-WAY VEHICLE SEAT ADJUSTER

BRIEF SUMMARY OF THE INVENTION

In accordance with the present invention a vehicle seat, preferably a bucket type seat construction, comprises a pair of elongated laterally spaced stationary mounting bases. A carriage is slidable longitudinally of the bases fore and aft of the vehicle, the movement being effected by a rack and pinion. The rack is formed in the stationary seat supporting bases and the pinion is carried by the movable carriage.

Connected to opposite ends of the carriage are independently operable lift arms connected to the front and rear edge portions of the seat frame. Each lift arm comprises a lever having a toothed sector in mesh with a worm driven pinion. When both lift arms are operated simultaneously the seat is raised or lowered. If either arm is operated while the other remains stationary, the seat is tilted.

A single driving motor is carried by the carriage and drives a worm which is in mesh simultaneously with two worm gears. One of the worm gears is associated with two independently operable clutches by means of which it may be selectively coupled to the actuating mechanism for one of the lift arms. The other worm gear is associated with a third clutch by means of which it may be coupled to the pinion in mesh with the rack.

The motor is an electric motor which may be driven in forward or reverse directions and thus, complete control of the position and attitude of the bucket seat is obtained.

BRIEF DESCRIPTION OF THE DRAWINGS

FIG. 1 is a plan view partly broken away, of the seat supporting structure with the vehicle seat removed.

FIG. 2 is a front elevational view of the structure seen in FIG. 1.

FIG. 3 is a side elevational view with parts broken away, looking in the direction of the arrow 3 in FIG. 1.

FIG. 4 is an enlarged fragmentary sectional view on the line 4—4, FIG. 3.

FIG. 5 is an enlarged fragmentary sectional view on the line 5—5, FIG. 3.

FIG. 6 is an enlarged fragmentary sectional view on the line 6—6, FIG. 3.

FIG. 7 is an enlarged sectional view on the line 7—7, FIG. 2.

FIG. 8 is a sectional view on the line 8—8, FIG. 7.

FIG. 9 is a sectional view on the line 9—9, FIG. 8.

DETAILED DESCRIPTION

Figure 10:
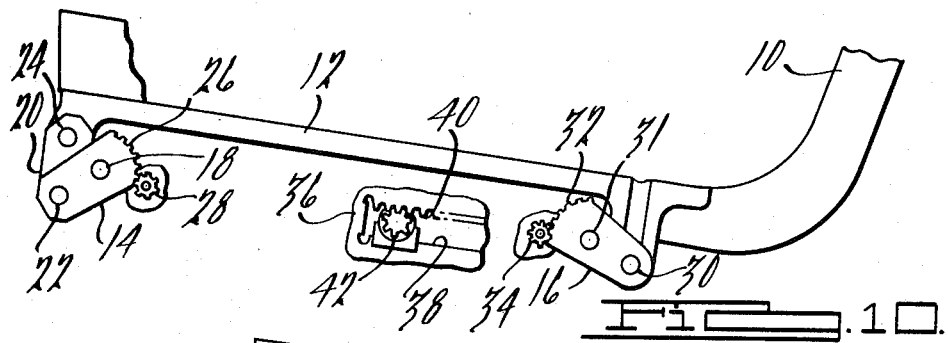
FIGS. 10–13 are diagrammatic views illustrating different positions into which the seat is movable.

Referring first to the diagrammatic views of FIGS. 10–13, the construction comprises means for effecting adjustment of a bucket seat, a portion of which is indicated at 10. The seat is connected to a seat supporting frame 12 which is connected adjacent the forward and rear edges thereof to lift arms 14 and 16 respectively. The forward lift arm 14 is pivoted to a carriage which is not shown in these Figures, by pivot means indicated at 18. The carriage is indicated generally at 19 in FIG. 2. The arm 14 is connected to the forward end of the seat frame 12 by a link 20 which is pivoted to one of the arms 14 as indicated at 22 and which is pivoted to the frame 12 as indicated at 24. The arm 14 is provided with a toothed sector 26 in mesh with an actuating pinion 28.

A similar construction is provided for raising and lowering the rear end of the seat frame 12 and in this case the arm 16 is pivoted directly to the frame as indicated at 30 and is pivoted as indicated at 31 to the carriage 19. The arm 16 has a toothed sector 32 in mesh with an actuating pinion 34.

The seat construction is mounted on stationary rails which are not illustrated in their entirety in these Figures, but the rails include vertical flange portions 36 having elongated openings 38 the upper edges of which are provided with rack teeth 40.

The carriage 19 carries a pinion 42 in mesh with the rack 40 and is effective when rotated to adjust the carriage 19 from front to rear of the vehicle.

The pinions 28, 34 and 42 are all carried by and rotatably mounted on the carriage 19 and are selectively actuated by mechanism which will be described subsequently.

Referring now to FIG. 10 it will be observed that carriage 19 which carries the pinion 42, is positioned so that the pinion engages the forward end of the rack 40 so that the bucket seat 10 is in its foremost position. At the same time, the arms 14 and 16 are both swung downwardly about their pivot mountings 18 and 31 so that the seat occupies its lowermost position.

Figure 11:
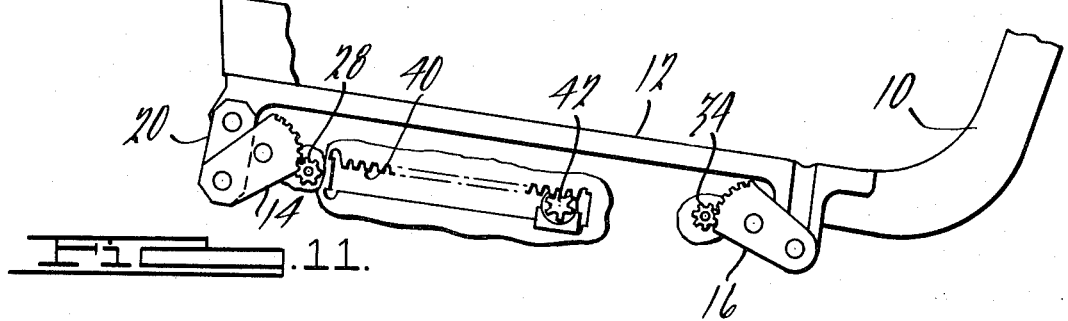

In FIG. 11 the pinion 42 has been operated to shift the carriage 19 rearwardly so that the pinion 42 engages the rear end of the rack 40 and accordingly, the carriage 19 is in its rearmost position of adjustment. The lift arms 14 and 16 have not been moved from the positions illustrated in FIG. 10 so that the seat 10 still occupies its lowermost position.

Figure 12:
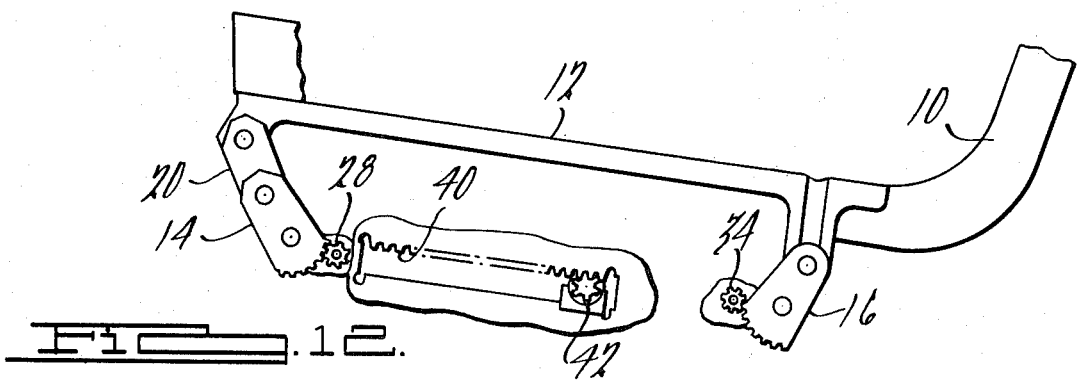

In FIG. 12 the seat 10 occupies a position resulting from movement of the lift arms 14 and 16 to their upwardly extending position. This movement is permitted without binding by reason of the connection of the forward arm 14 to the seat frame 12 by means of the link 20. Accordingly, in FIG. 12 the seat 10 occupies its rearmost position and at the same time is in its highest position of adjustment.

Figure 13:
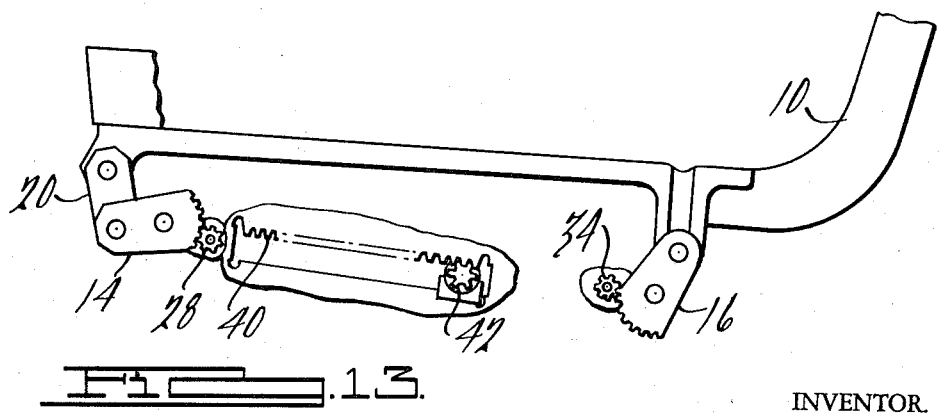

In FIG. 13 the seat has been adjusted from the position illustrated in FIG. 12 by rotating the forward lift arm 14 downwardly while leaving the lift arm 16 in its upwardly extending position and maintaining the pinion 42 in its rearmost position relative to the rack 40. Accordingly, in this Figure the seat has been tilted forwardly and downwardly essentially around the axis of the pivot connection 30 which has remained stationary due to the stationary position of the arm 16. The seat remains in its rearmost position.

The foregoing adjustments are accomplished by the power actuated mechanism which will now be described.

Mounted on the floor of the vehicle are mounting bases or rails 50 each of which is provided with carriage supporting brackets or slides 52 which may be riveted as indicated at 54 to the upstanding vertical flange portions 36 of the mounting bases or rails 50.

The carriage, indicated generally at 19, comprises longitudinally extending laterally open channel members 56. Brackets 52 at their ends carry blocks 58 of low friction material which are slidable longitudinally in the recesses at opposite sides of the channels. With this arrangement the carriage 19 is slidable longitudinally of the stationary mounting bases in a generally fore and aft direction of the vehicle. In practice, the base is somewhat forwardly and upwardly inclined although it may of course be horizontal.

The carriage 19 is in general formed by two laterally spaced portions each of which is associated with one of the mounting bases, and opposite sides of the carriage are interconnected by torsion tubes 60, 61 and 62. Rigidly mounted on one of the lateral portions of the carriage 19 by a bracket indicated at 64 is an electric motor 66 which is adapted to be actuated in forward or reverse direction by manually controlled switch means. The motor 66 has an output shaft 68 which as best seen in FIG. 7, terminates in a worm 70 in mesh with worm gears 72 and 74.

Worm gear 72 is associated with a longitudinally extending shaft 76 to which it may be selectively coupled by clutch means including a clutch member 78 normally urged by a spring 80 into disengaging position but adapted to be moved into clutching relation by a clutch actuating lever 82 operated by a plunger 84 of a solenoid 86.

Similar means are provided for connecting the worm gear 72 to the forwardly extending shaft 88 and comprises a clutch actuating lever 90 actuated by solenoid means including the plunger 92.

Similar clutch mechanism indicated generally at 94 is provided for coupling the worm gear 74 to the shaft 96.

Planetary gearing is provided to connect the shafts 76 and 88 to the lift arms adjacent the forward and rear edges of the seat construction. Details of this gearing and connecting means is best seen in FIGS. 4, 6 and 7. The shaft 76 is provided adjacent its rear end with a worm 100 received in an enlargement indicated at 102 in a housing portion 104 of the carriage 19. Worm 100 meshes with a worm gear 106 which as best seen in FIG. 4 is mounted for rotation on a shaft 108 which extends from the channel 56 through a wall 110 of housing structure which includes a stationary ring gear 112. The worm gear 106 has a reduced portion provided with teeth forming a sun gear 114.

Mounted for rotation on the shaft 108 is a carrier plate 116 having a plurality of planetary gears 118 carried thereby, each of which is in mesh with the stationary ring gear 112 and the rotatable sun gear 114. Fixed to the plate 116 is the lift pinion 34 previously described, which is in mesh with the teeth 120 formed on the sector portion of the lift arm 16.

As best seen in FIGS. 3 and 6, the lift arm 16 is pivoted as indicated at 30 to a depending arm 122 on the seat frame 12.

In order to insure uniform lifting at opposite sides of the seat, a pair of lift arms 16 are provided and they are interconnected by the torsion tube 62 having torsion pins 124 secured to the lift arms and extending a short distance into the opposite open ends of the torsion tube 62.

It will be understood of course that the construction for raising and lowering the forward edge of the seat is substantially the same except for the provision of the link 20 which permits independent lifting of the front and rear edges of the seat without binding.

The arrangement providing for fore and aft movement of the seat construction along the mounting base is best illustrated in FIG. 5. Here, it will be observed that shaft 96, as best seen in FIG. 7, is provided adjacent its rear end with a worm 128 which is in mesh with a worm gear 130 provided on shaft 132. Adjacent its outer end the shaft 132 is provided with the pinion 42 in mesh with the rack 40 provided in the plate 36. Obviously, rotation of the shaft 132 effects longitudinal sliding movement of the carriage 19 longitudinally of the mounting base. Again, in order to provide for equal movement of opposite sides of the seat construction, a pair of rack and pinion units are provided at opposite sides of the seat construction and the rotating pinions thereof are interconnected by a torsion tube 140 in the open ends of which are received short lengths of the shafts 132 carrying the worm gears 130 and/or the pinion 42.

With the foregoing construction there is provided a very simple and efficient arrangement for effecting six-way adjustment of bucket seats from motor means individually mounted for movement with parts of the seat construction. The motor may be operated in forward or reverse direction and selectively coupled to the means for raising and lowering the front and rear edges of the seat and the means for effecting longitudinal sliding of the seat.

What I claim as my invention is:

1. Six-way seat adjusting mechanism for a vehicle seat comprising a generally horizontal support adapted to be positioned to extend fore and aft of a vehicle, a carriage slidable longitudinally on said support, and a seat frame connected by pivoted lift arms at its front and rear edges to said carriage, a reversible motor mounted on said carriage, said carriage comprising a housing having a driving worm therein, a drive shaft connecting said motor and worm, a first worm gear in said housing in mesh with said worm, first and second aligned shafts coaxial with said first worm gear, independently operable clutches for selectively coupling the adjacent ends of said first and second shafts to said first worm gear, the other ends of said first and second shafts extending to points adjacent the front and rear edges of said seat frame, gearing connecting the said other ends of said first and second shafts to said lift arms, a second worm gear in said housing in mesh with said worm, a third shaft coaxial with said second worm gear, a clutch for selectively coupling said third shaft to said second worm gear, said support comprising a rack extending longitudinally thereof, a pinion in mesh with said rack, and gearing connecting said third shaft to said pinion.

2. Mechanism as defined in claim 1 in which the gearing connecting the lift arms to the said other ends of said first and second shafts comprises planetary gearing.

3. Mechanism as defined in claim 1 in which said housing includes elongated extensions which receive said first, second and third shafts.

4. Mechanism as defined in claim 2 in which said housing includes elongated extensions which receive said first, second and third shafts.

5. Mechanism as defined in claim 4 in which the elongated extensions of the housing which receive said first and second shafts have enlarged end portions remote from said first worm gear, said end portions having lateral openings therein which are toothed to form stationary ring gears of the said planetary gearing.

* * * * *